H. N. WAYNE.
TIRE.
APPLICATION FILED DEC. 19, 1916.
1,266,361.
Patented May 14, 1918.
2 SHEETS—SHEET 1.
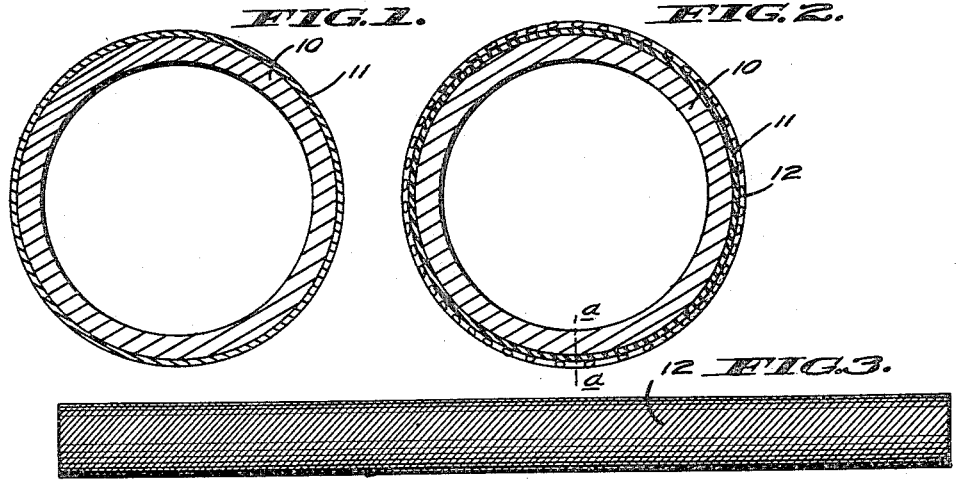
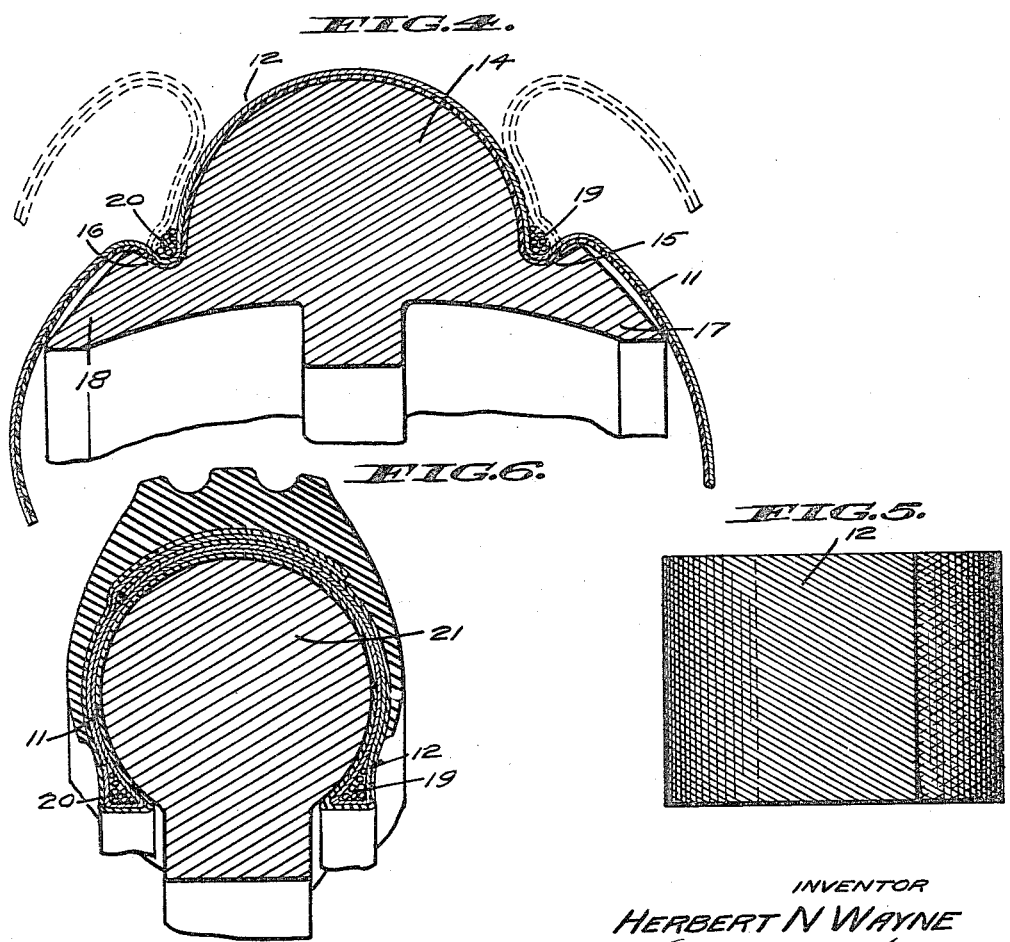
INVENTOR
HERBERT N WAYNE
BY Hazard & Miller
ATTORNEYS H. N. WAYNE.
TIRE.
APPLICATION FILED DEC. 19, 1916.
1,266,361.
Patented May 14, 1918.
2 SHEETS—SHEET 2.
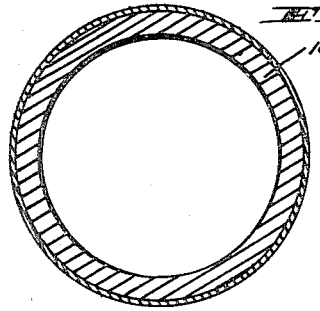
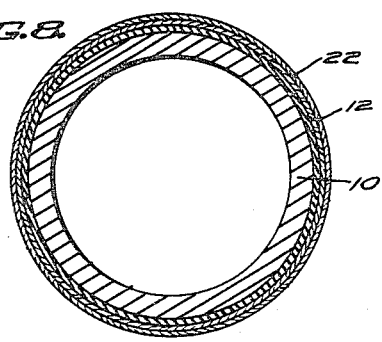
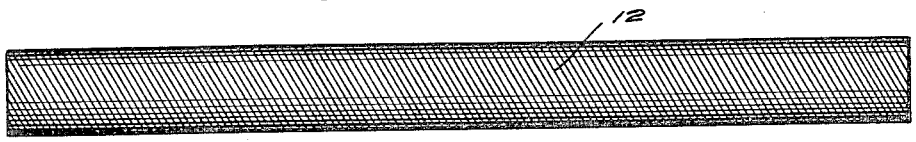
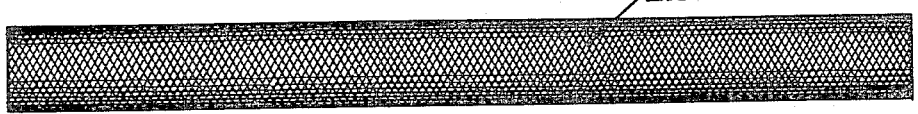
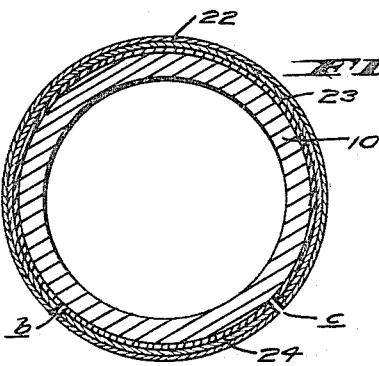
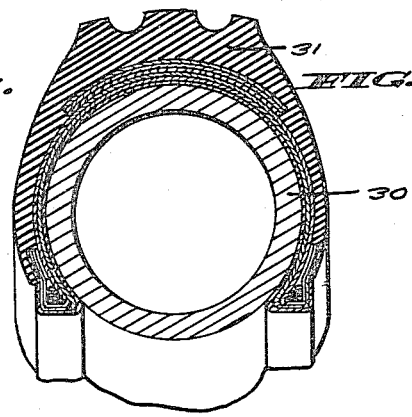
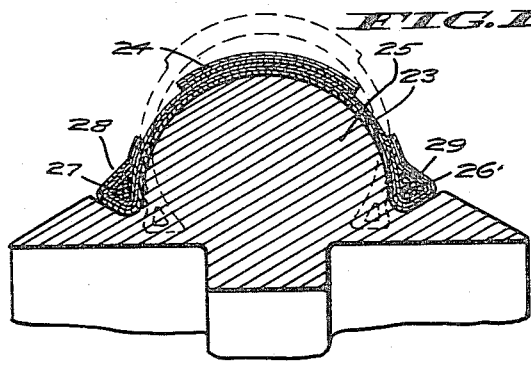
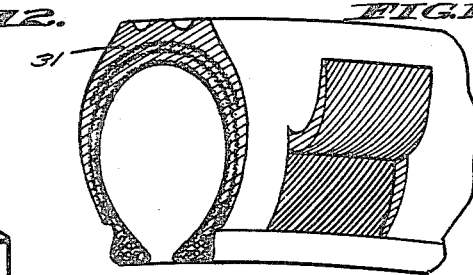
INVENTOR
HERBERT N. WAYNE:
BY Hazard and Miller
ATTORNEYS.

UNITED STATES PATENT OFFICE.

HERBERT N. WAYNE, OF LOS ANGELES, CALIFORNIA.

TIRE.

1,266,361.     Specification of Letters Patent.     Patented May 14, 1918.

Application filed December 19, 1916. Serial No. 137,894.

*To all whom it may concern:*

Be it known that I, HERBERT N. WAYNE, a citizen of the United States, residing at Los Angeles, in the county of Los Angeles and State of California, have invented new and useful Improvements in Tires, of which the following is a specification.

This invention relates to a pneumatic tire casing.

It is the object of this invention to provide a tire reinforced against blow-outs and the like.

A further object of this invention is to provide a tire casing formed of few constructive elements adapted to be folded and arranged in such a manner as to form a unitary tire structure and to be cut so that there will be no waste in the material used.

Other objects will appear hereinafter.

The invention is illustrated, by way of example, in the accompanying drawings in which:

Figure 1 is a view in transverse section as seen through the winding mandrel upon which has been placed a tire lining of thin rubber.

Fig. 2 is a view similar to the preceding view illustrating the tire lining as covered with a layer of reinforcing cords and thereby disclosing the formation of a one ply semi-elastic fabric.

Fig. 3 is a view in elevation illustrating the tire lining as covered with the reinforcing cord fabric and particularly discloses the helical arrangement of said fabric cords.

Fig. 4 is a view in transverse section as seen through one of the building cores illustrating the manner in which the semi-elastic cord fabric is shaped prior to the application of the rubber outer tread.

Fig. 5 is a view in elevation illustrating a segmental portion of the tire carcass after it has been taken from the building core.

Fig. 6 is a view in transverse section as seen through the vulcanizing core and particularly illustrates the semi-elastic cord fabric mounted thereon and supplied with an outer rubber tread.

Fig. 7 is a view similar to Fig. 1 illustrating the first step in the formation of another form of the tire fabric.

Fig. 8 is a view similar to Fig. 7 and particular discloses a layer of fine cord or thread wrapped around the tire's inner lining and upon which another layer of fine cord or thread is wrapped to form a two ply semi-elastic tire fabric.

Fig. 9 is a view in elevation disclosing the casing lining as covered with the first layer of cord or thread.

Fig. 10 is a view in elevation disclosing the casing lining as covered with both layers of cord or fabric arranged diagonally to each other and helically disposed upon the lining.

Fig. 11 is a view similar to Fig. 8 illustrating the manner in which the semi-elastic fabric is cut after it has been formed upon its mandrel.

Fig. 12 is a view of the tire carcass as formed from the semi-elastic fabric disclosed in Fig. 11 and as mounted upon the building core.

Fig. 13 is a view illustrating the completed casing as seen in transverse section and as positioned upon the vulcanizing core.

Fig. 14 is a view in perspective illustrating another form of tire casing and the manner in which the semi-elastic lining is folded to form a diagonally woven fabric within the body of the casing.

Referring more particularly to the drawings, 10 indicates a tubular winding mandrel which is formed as a straight cylinder and upon which is adapted to be wound a layer of rubber 11. The layer of rubber is afterward covered with cable cords 12 formed of any desired material, but preferably formed of cotton. These cords are wrapped around the mandrel in a helical fashion and in close contact with each other, thus providing a continuous layer of cord forming a continuous corded surface. When cotton cord is used it is preferable to treat it with a solution of creosote, carbolic acid or other desired preservatives and thereafter give it a coat of rubber cement to preserve it from deterioration by moisture and increase the durability. The treatment of the cotton fabric with creosote also gives it the property of adhering firmly to the rubber to which it is vulcanized, thus avoiding peeling or splitting off therefrom, which is a common defect of untreated cotton fabric in automobile tires. After the cords have been properly placed upon an inner lining a thin layer of rubber is wrapped around the cords and rolled under suitable pressure to form a homogeneous semi-elastic fabric from which the carcass of the tire is made.

After the helical fabric, as disclosed in Fig. 2, has been formed it is then cut longitudinally along the line a—a and removed from the mandrel. Attention is here directed to the fact that the mandrel 10 is of greater diameter than that of the finished tire and in practice is approximately 10 inches in diameter for the construction of a 4 inch casing. After the helically corded tire fabric has been removed from the mandrel it is mounted upon a building core 14. This core is circular and has a cross section as indicated in Fig. 4 of the drawings in which it will be seen that the sectional contour of the core includes an annular semicircular body portion at the opposite sides of which are bead forming grooves 15 and 16 supported by suitable working flanges 17 and 18 which extend outwardly and downwardly from the grooves. The tire fabric which has previously been removed from the mandrel is now positioned over the semi-circular body portion of the body core and drawn down thereupon by means of bead wires 19 and 20 which draw the sides of the fabric down into the bead forming grooves 15 and 16, thus forming the equatorial portion of the fabric into the shape required for a tire tube of given size.

Due to the large diameter of the winding mandrel 10 there will be surplus width of the fabric extending outwardly from each side of the beads. This surplus is folded upwardly around the bead wires 19 and 20 and rolled just above the bead wires against the body portion of the carcass as now being formed. The rubber binding covering of the fabric will thus be brought to bear upon itself and will adhere thereto in a manner to retain the bead wires in position. The building core may then be removed from the partially formed carcass and a vulcanizing core 21 inserted in its place, after which the marginal edges of the fabric lining are finally folded over the main body of the carcass and secured in overlapping relation to each other. It will be noted that this arrangement may obviate the use of a breaker strip and will provide a reinforced tread section formed of diagonally disposed layers of cord. A rubber tread may now be positioned upon the carcass and the entire casing inclosed within a curing mold.

In some instances it may be found that the marginal edges of the helical fabric may be drawn to an overlapping position while still upon the building core. This will be possible when the marginal edges of the lapping portions of the fabric will stretch sufficiently to accommodate the diameter of the tire. When this is done the rubber tread may be mounted upon the carcass while still in position upon the building core and thereby eliminate one operation in the process of making the casing.

In the form of tire disclosed in Figs. 7 to 13 inclusive, multiple layers of cord or thread are utilized. It is believed, however, to be preferable to form these layers of alternate strands of cotton and asbestos threads arranged in diagonal relation to each other and thus forming a fabric which possesses great strength, as well as heat insulating qualities. It will be understood that the cotton thread will be treated as previously described and that it may be preferable under various conditions to form the fabric entirely of cotton thread or asbestos thread.

In the formation of this second casing a layer of rubber is wrapped around the mandrel 10, as previously described, after which a layer of thread is wrapped, this thread being of cotton, asbestos or a combination of both. A layer 22 of asbestos thread or asbestos alternated with cotton is then wrapped around the tire in helical fashion and diagonal to the previous thread formation. The layers of rubber and plies of fabric are then covered with the cotton or rubber which is subjected to pressure to form a homogeneous tire fabric. The tire carcass may then be constructed as previously described for the one ply fabric. However, as shown in Fig. 11 of the drawings, it is cut along the lines $b$ and $c$, thus providing a body portion 23 and an arcuate strip 24. These strips are used to form the tire carcass, the strip 23 being first placed over the building core 25 and drawn down by bead wires 26 and 27 to form side beads 28 and 29, after which the portion 24 is mounted upon the crown of the carcass to form a breaker strip. The carcass thus formed may then be mounted over a vulcanizing core 30 and there supplied with a rubber tread 31.

It may be deemed desirable in the formation of large tire casings to construct them as illustrated in Fig. 14 of the drawings, in which case the inner layers of fabric may be entirely of cotton thread, after which a separate layer of asbestos fabric may be positioned over the inner fabric. This will be covered with a breaker strip formed of a portion of the asbestos fabric. It will be evident that a tire thus formed will require two mandrels for the construction of the tire carcass fabric. One upon which the cotton thread fabric is made and another upon which the asbestos fabric is made. It may be found desirable to form the other tire fabrics upon a plurality of mandrels.

It will thus be seen that the method of forming a tire casing here disclosed provides that a carcass of few parts may be formed and simply constructed without waste of material or the necessity of numerous splices in the layers of fabric and also that the casing may be readily made and will be of great strength and durability.

While I have shown the preferred tire casing, as now known to me, it will be understood that various changes in the combination, construction and arrangement of parts may be made by those skilled in the art without departing from the spirit of my invention.

I claim:

A tire casing, comprising a carcass formed with an inner lining constructed of rubber and diagonally arranged fabric cords composed of alternate strands of cotton and asbestos and forming a sheet, said fabric cords being embedded within rubber, the sides of said sheet being folded upon the central portion thereof so that the cords of said sides lie diagonally across the cords of said central portion, said folded sides forming a breaker strip, and a rubber tread vulcanized to said carcass.

In testimony whereof I have signed my name to this specification.

HERBERT N. WAYNE.